US006826653B2

(12) United States Patent
Duncan et al.

(10) Patent No.: US 6,826,653 B2
(45) Date of Patent: Nov. 30, 2004

(54) BLOCK DATA MOVER ADAPTED TO CONTAIN FAULTS IN A PARTITIONED MULTIPROCESSOR SYSTEM

(75) Inventors: Samuel H. Duncan, Arlington, MA (US); Frederick C. Canter, Nashua, NH (US); Darrel D. Donaldson, Lancaster, MA (US); David W. Hartwell, Bolton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 10/068,427

(22) Filed: Feb. 6, 2002

(65) Prior Publication Data

US 2003/0149844 A1 Aug. 7, 2003

(51) Int. Cl.[7] .............................................. G06F 12/00
(52) U.S. Cl. ...................... 711/141; 711/138; 711/162; 714/6
(58) Field of Search ......................... 711/141–146, 129, 711/114, 124, 138, 162, 154, 170–173; 714/6; 710/309, 100, 105

(56) References Cited

U.S. PATENT DOCUMENTS

| | | | | | |
|---|---|---|---|---|---|
| 4,903,194 | A | * | 2/1990 | Houdek et al. ............... | 714/53 |
| 5,018,060 | A | * | 5/1991 | Gelb et al. .................. | 707/205 |
| 5,297,269 | A | | 3/1994 | Donaldson et al. | |
| 5,604,882 | A | | 2/1997 | Hoover et al. | |
| 5,615,334 | A | * | 3/1997 | Wang et al. .................. | 714/48 |
| 5,623,635 | A | * | 4/1997 | Chen et al. ................. | 711/152 |
| 5,652,885 | A | | 7/1997 | Reed et al. | |
| 6,012,127 | A | * | 1/2000 | McDonald et al. ......... | 711/141 |
| 6,088,770 | A | | 7/2000 | Tarui et al. | |
| 6,170,044 | B1 | * | 1/2001 | McLaughlin et al. ....... | 711/162 |
| 6,189,078 | B1 | * | 2/2001 | Bauman et al. ............. | 711/156 |
| 6,314,501 | B1 | | 11/2001 | Gulick et al. | |
| 6,463,510 | B1 | * | 10/2002 | Jones et al. ................. | 711/138 |
| 6,470,429 | B1 | * | 10/2002 | Jones et al. ................. | 711/138 |
| 2002/0144177 | A1 | * | 10/2002 | Kondo et al. ................ | 714/13 |

OTHER PUBLICATIONS

Woo, S., Singh, J. and Hennessy, J., The Performance Advantages of Integrating Block Data Transfer in Cache-Coherent Multiprocessors, pp. 219–229, (c) 1994 ACM.

Speigt, E., Abdel–Shafi, H. and Bennett, J., An Integrated Shared–Memory/Message Passing API for Cluster–Based Multicomputing, Proceedings of the Second LASTED International Conference on Parallel and Distributed Computing and Networks, Dec. 1998, pp. 146–153.

Heinlein, J. Bosch, R. and Gharachrloo, K., Coherent Block Data Transfer in the FLASH Multiprocessor, Proceedings of the 11th International Parallel Processing Symposium, Apr. 1–5, 1997.

* cited by examiner

Primary Examiner—Mano Padmanabhan
Assistant Examiner—Thang H Ho

(57) ABSTRACT

A system and method are provided for moving information between cache coherent memory systems of a partitioned multiprocessor computer system while containing faults to a single partition. The multiprocessor computer system includes a plurality of processors, memory subsystems and input/output (I/O) subsystems that can be divided into a plurality of partitions. Each I/O subsystem includes at least one I/O bridge for interfacing between one or more I/O devices and the multiprocessor system. The I/O bridge has a data mover configured to retrieve information from a "source" partition and to store that information within its own "destination" partition. When activated, the data mover issues a request to the source partition for a non-coherent copy of the information. The home memory subsystem in the source partition preferably responds to the request by sending the data mover "valid", but non-coherent copy of the information, e.g., a "snapshot" of the information as of the time of the request. Upon receiving the information, the data mover may copy it into the memory subsystem of the destination partition.

19 Claims, 8 Drawing Sheets

BLOCK DATA MOVER ADAPTED TO CONTAIN FAULTS IN A PARTITIONED MULTIPROCESSOR SYSTEM

BACKGROUND OF THE INVENTION

1. Field of the Invention

This invention relates to multiprocessor computer architectures and, more specifically, to the sharing or exchanging of information among partitions of a multiprocessor computer system.

2. Background Information

Symmetrical multiprocessor (SMP) computer systems support high performance application processing. Conventional SMP systems include a plurality of interconnected nodes. Each node typically includes one or more processors as well as a portion of system memory. The nodes may be coupled together by a bus or by some other data transfer mechanism. One characteristic of a SMP computer system is that all or substantially all of the system's memory space is shared among all nodes. That is, the processors of one node can access programs and data stored in the memory portion of another node. The processors of different nodes can also use system memory to communicate with each other by leaving messages and status information in shared memory space.

When a processor accesses (loads or stores to) a shared memory block from its own home node, the reference is referred to as a "local" memory reference. When the reference is to a memory block from a node other than the requesting processor's own home node, the reference is referred to as a "remote" memory reference. Because the latency of a local memory access differs from that of a remote memory accesses, the SMP system is said to have a Non-Uniform Memory Access (NUMA) architecture. Furthermore, if the memory blocks of the memory system are maintained in a coherent state, the system is called a cache coherent, NUMA architecture.

Partitions

The nodes or processors of a SMP computer system can also be divided among a plurality of partitions, increasing the operating flexibility of the SMP system. FIG. 1, for example, is a schematic, block diagram of an SMP computer system 100 comprising a plurality of interconnected nodes 102. Each node 102, moreover, includes a processor unit (P) 104 and a corresponding memory unit (MEM) 106. The nodes 102 have been divided into a plurality of, e.g., four, partitions 108a–d, each comprising four nodes 102. A separate operating system or a separate instance of the same operating system runs on each partition 108a–d. In a partitioned system it is often desirable to permit the processors 104 located in different partitions, e.g., partitions 108a and 108d, to exchange information, e.g., to communicate with each other. To this end, a portion of memory 106 at one or more nodes 102, such as memory portions 110 at each node 102, may be designated as global shared memory. Information or data stored at a global shared memory portion 110 of a first partition, e.g., partition 108a, may be accessed by the processors 104 located within a second partition, e.g., partition 108d.

Although the use of global shared memory in a partitioned computer system allows the processors to share information across partition boundaries, it can result in errors or faults occurring in one partition causing errors or faults in other partitions. For example, in a cache coherent system, the state, e.g., the ownership, of memory blocks changes in response to reads or writes to those memory blocks. Two processors each located in a different partition and thus each running a different operating system may nonetheless share ownership of a memory block from some portion of global shared memory. A fault or failure in one partition that effects the shared memory block may cause a corresponding fault or failure to occur in the other partition.

To prevent such faults from crossing partition boundaries, the global shared memory can be made non-coherent. However, this approach may result in a partition obtaining stale information from the global shared memory. Specifically, the processor of a first partition may obtain a copy of a memory block from some portion of global shared memory before that memory block has been updated by some other processor. Use of such stale information within the first partition can introduce errors. Another approach to prevent faults from crossing partition boundaries is to move data between partitions through one or more input/output (I/O) devices. With this approach, data from a first partition is read from system memory by an I/O device within the first partition. The I/O device then transfers that data to an I/O device coupled to a second partition, thereby making the data available to the processors of the second partition. This approach also suffers from one or more drawbacks. In particular, the busses coupled to the I/O devices nearly always run at a fraction of the speed of the processor or memory busses. Accordingly, transferring data through multiple I/O devices takes substantial time and may introduce significant latencies.

Accordingly, a need exists for a system that efficiently transfers information between the partitions of a multiprocessor computer system that nonetheless prevents faults in one partition from affecting other partitions.

SUMMARY OF THE INVENTION

Briefly, the invention relates to a system and method for moving information between cache coherent memory subsystems of a partitioned multiprocessor computer system that prevents faults in one partition from affecting other partitions. The multiprocessor computer system includes a plurality of processors, memory subsystems and input/output (I/O) subsystems that can be segregated into a plurality of partitions. Each processor may have one or more processor caches for storing information, and each I/O subsystem includes at least one I/O bridge that interfaces between one or more I/O devices and the multiprocessor system. To maintain the coherence of information stored at the memory subsystems and the processor caches, the multiprocessor system may employ a directory based cache coherency protocol. According to the present invention, the I/O bridge has a data mover configured to retrieve information from a "source" partition and store it within the cache coherent system of its own "destination" partition.

Specifically, when an initiating processor in the source partition wishes to make information, e.g., one or more memory blocks, from a region of global shared memory available to a target processor of a destination partition, the initiating processor preferably issues a write transaction to its I/O bridge. The I/O bridge then notifies the target processor that information in the source partition's region of global shared memory is ready for copying, preferably by sending the target processor a Message Signaled Interrupt (MSI) containing an encoded message from the initiating processor. The target processor then configures or sets up the data mover in its I/O bridge to perform the transfer. In particular, the target processor provides the data mover with the memory address of the information in the source partition's global shared memory. The target processor also provides the data mover with the memory address within the destination partition to which the information is to be stored. Once the setup phase is complete, the target processor issues a start command to the data mover. In response, the data mover issues a request to the source partition for a non-coherent copy of the specified information. The home memory subsystem of the source partition preferably responds to the request by sending an "valid", but non-coherent copy of the specified information, e.g., a "snapshot" of the information as of the time of the request, to the data mover in the destination partition. By requesting a non-coherent copy of the information, the data mover in the destination partition does not cause a change of ownership of the respective information to be recorded at the source partition.

The data mover in the destination partition also requests exclusive ownership over the memory block(s) within the destination partition to which the transferred information is to be written. Upon obtaining exclusive ownership, the data mover writes the information received from the source partition to the specified memory block(s) of the destination partition. The data mover may also provide an acknowledgement to the initiating processor at the remote partition. As shown, the specified information is copied from the source partition and entered into the cache coherent domain of the destination partition. Nonetheless, because the transfer was effected without the data mover in the destination partition becoming an owner of the information from the point of view of the source partition, a failure in either the source or destination partition will not affect the other partition.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
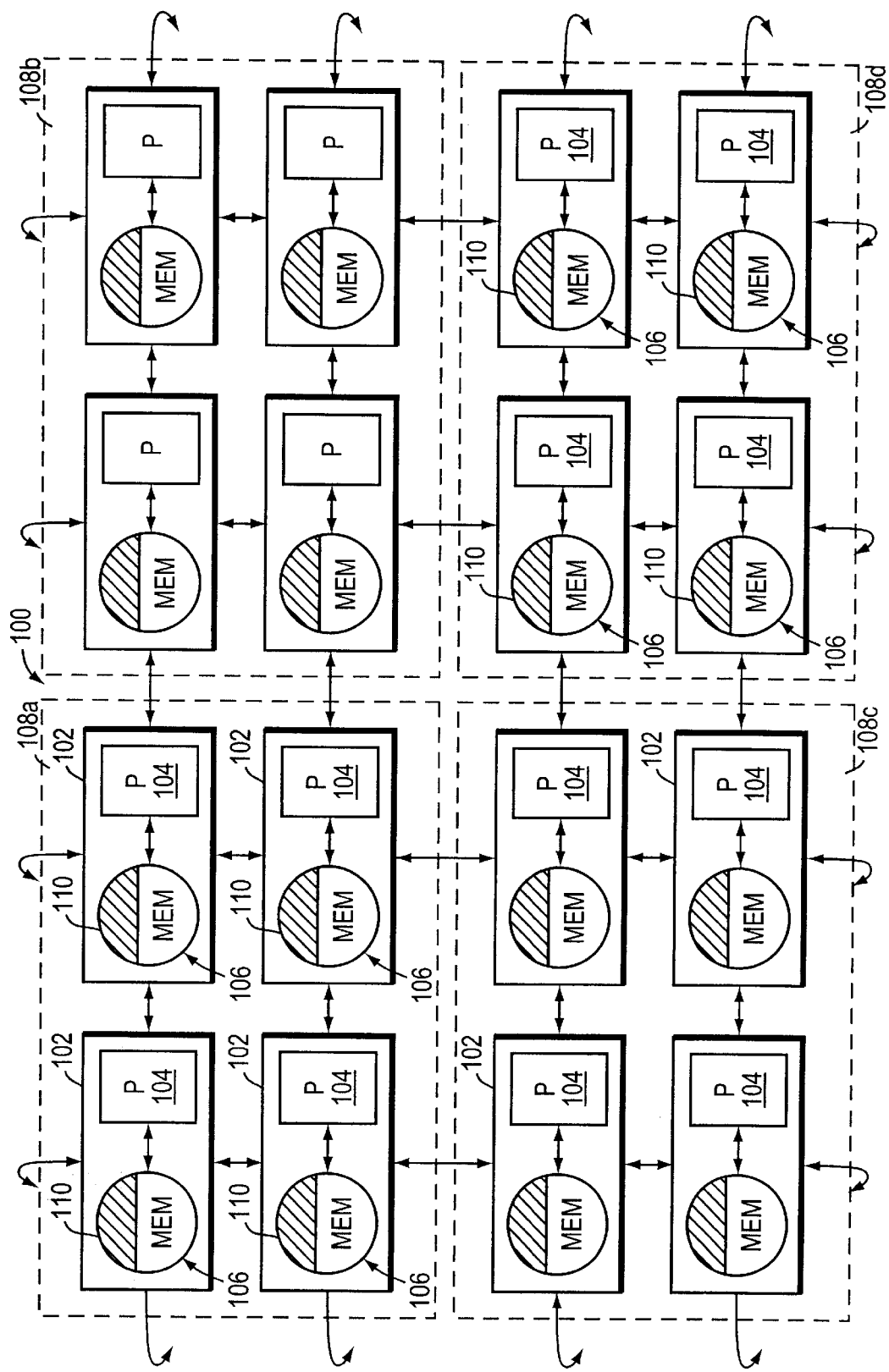
FIG. 1, previously discussed, is a schematic block diagram of a partitioned multiprocessor system.
Figure 2:
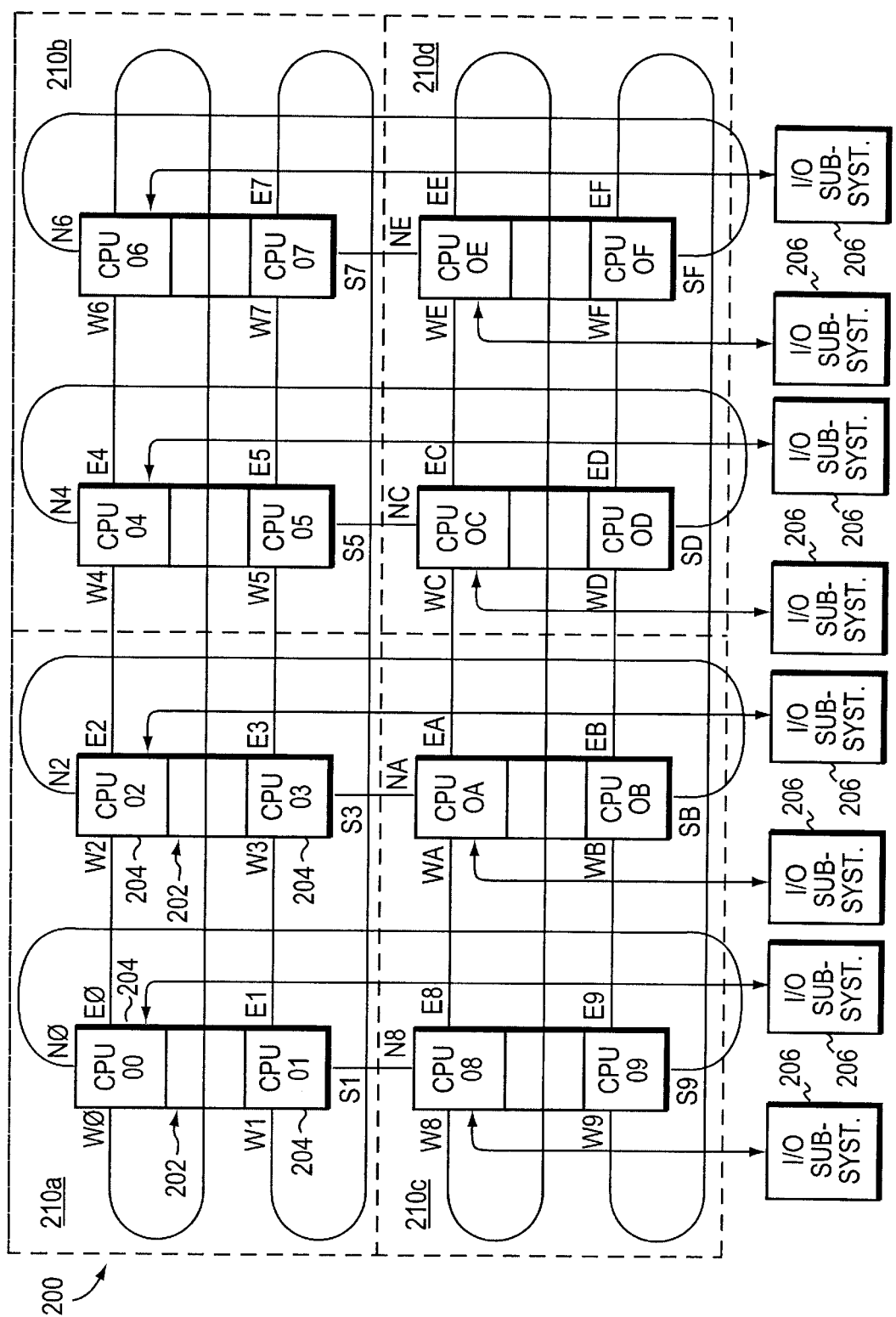
FIG. 2 is a schematic block diagram of a symmetrical multiprocessor computer system comprising a plurality of interconnected dual processor (2P) modules and organized into a plurality of partitions.

FIG. 2 is a schematic block diagram of a symmetrical multiprocessor (SMP) system 200 comprising a plurality of processor modules 202 interconnected to form a two dimensional (2D) torus or mesh configuration. Each processor module 202 preferably comprises two central processing units (CPUs) or processors 204 and has connections for two input/output (I/O) ports (one for each processor 204) and six inter-processor (IP) network ports. The IP network ports are preferably referred to as North (N), South (S), East (E) and West (W) compass points and connect to two unidirectional links. The North-South (NS) and East-West (EW) compass point connections create a (Manhattan) grid, while the outside ends wrap-around and connect to each other, thereby forming the 2D torus. The SMP system 200 further comprises a plurality of I/O subsystems 206. I/O traffic enters the processor modules 202 of the 2D torus via the I/O ports. Although only one I/O subsystem 206 is shown connected to each processor module 202, because each processor module 202 has two I/O ports, any given processor module 202 may be connected to two I/O subsystems 206 (i.e., each processor 204 may be directly coupled to its own I/O subsystem 206).

Figure 3:
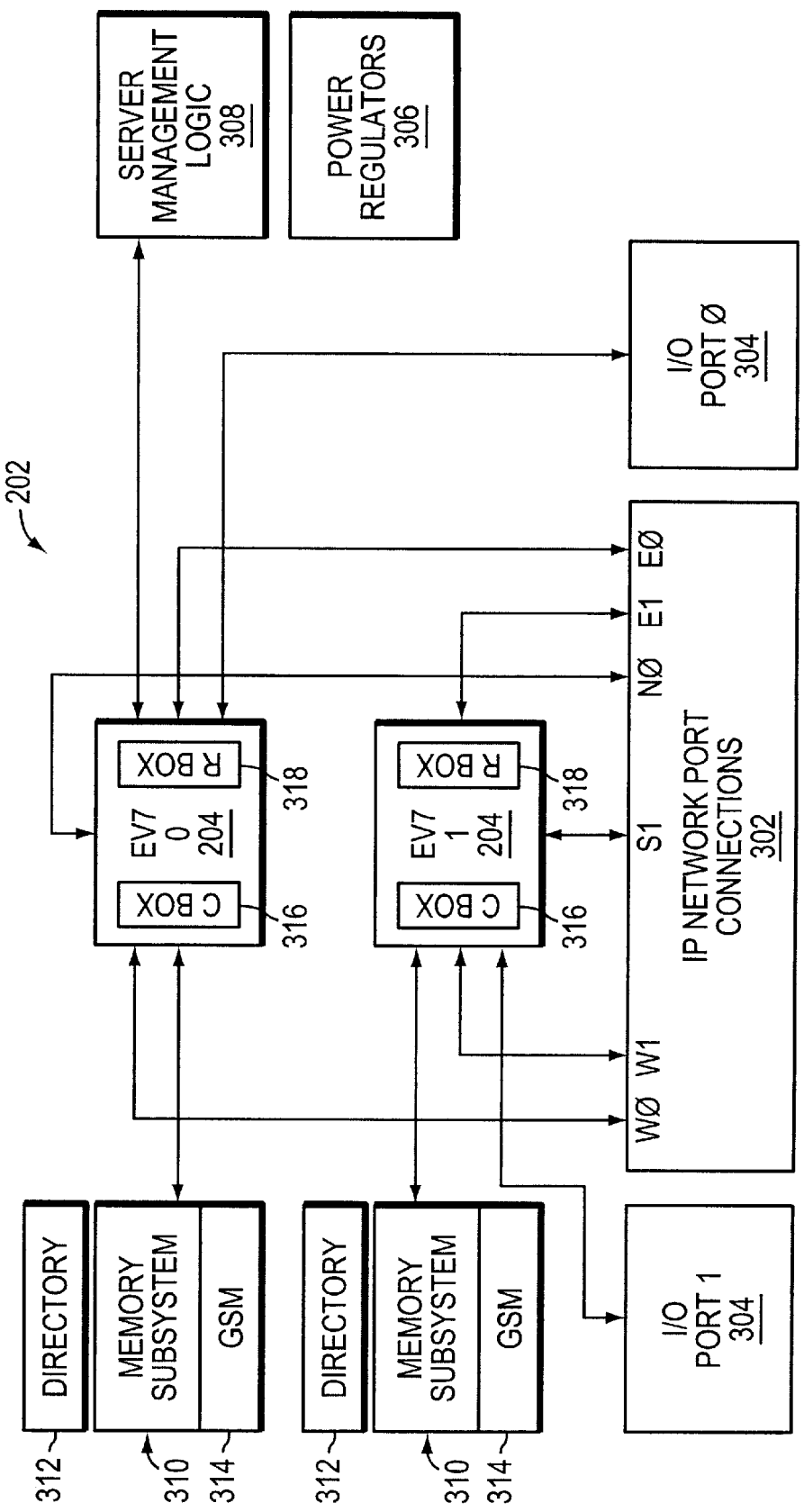
FIG. 3 is a schematic block diagram of a 2P module of the computer system of FIG. 2.

FIG. 3 is a schematic block diagram of a dual CPU (2P) module 202. As noted, each 2P module 202 preferably has two CPUs 204 each having connections 302 for the IP ("compass") network ports and an I/O port 304. The 2P module 202 also includes one or more power regulators 306, server management logic 308 and two memory subsystems 310 each coupled to a respective memory port (one for each CPU 204). The server management logic 308 cooperates with a server management system (not shown) to control functions of the computer system 200 (FIG. 2), while the power regulators 306 control the flow of electrical power to the 2P module 202. Each of the N, S, E and W compass points along with the I/O and memory ports, moreover, preferably use clock-forwarding, i.e., forwarding clock signals with the data signals, to increase data transfer rates and reduce skew between the clock and data.

Each CPU 204 of a 2P module 202 is preferably an "EV7" processor from Compaq Computer Corp. of Houston, Tex., that includes part of an "EV6" processor as its core together with "wrapper" circuitry that comprises two memory controllers, an I/O interface and four network ports. In the illustrative embodiment, the EV7 address space is 44 physical address bits and supports up to 256 processors 204 and 256 I/O subsystems 206. The EV6 core preferably incorporates a traditional reduced instruction set computer (RISC) load/store architecture. In the illustrative embodiment described herein, the EV6 core is an Alpha® 21264 processor chip manufactured by Compaq Computer Corporation, with the addition of a 1.75 megabyte (MB) 7-way associative internal cache and "CBOX" 316, the latter providing integrated cache controller functions to the EV7 processor. The EV7 processor also includes an "RBOX" 318 that provides integrated routing/networking control functions with respect to the compass points, and a "ZBOX" that provides integrated memory controller functions for controlling the memory subsystem 370. However, it will be apparent to those skilled in the art that other types of processor chips, such as processor chips from Intel Corp. of Santa Clara, Calif., among others, may be advantageously used.

Each memory subsystem 310 may be and/or may include one or more conventional or commercially available dynamic random access memory (DRAM), synchronous DRAM (SDRAM), double data rate SDRAM (DDR-SDRAM) or Rambus DRAM (RDRAM) memory devices. Data stored at the memory subsystems 310, moreover, is organized into separately addressable memory blocks or cache lines. Associated with each memory subsystem 310 may be one or more corresponding directory in flight (DIF) data structures (e.g., tables) 312. Each memory block defined in the SMP system 200 has a home memory subsystem 310, and the directory 312 associated with the block's home memory subsystem 310 maintains the cache coherency of that memory block. Each memory subsystem 310 may also be configured to include a global shared memory (GSM) region 314. As explained in more detail below, information stored in the GSM regions 314 is accessible by processors or other agents in other partitions of the SMP computer system 200.

Figure 4:
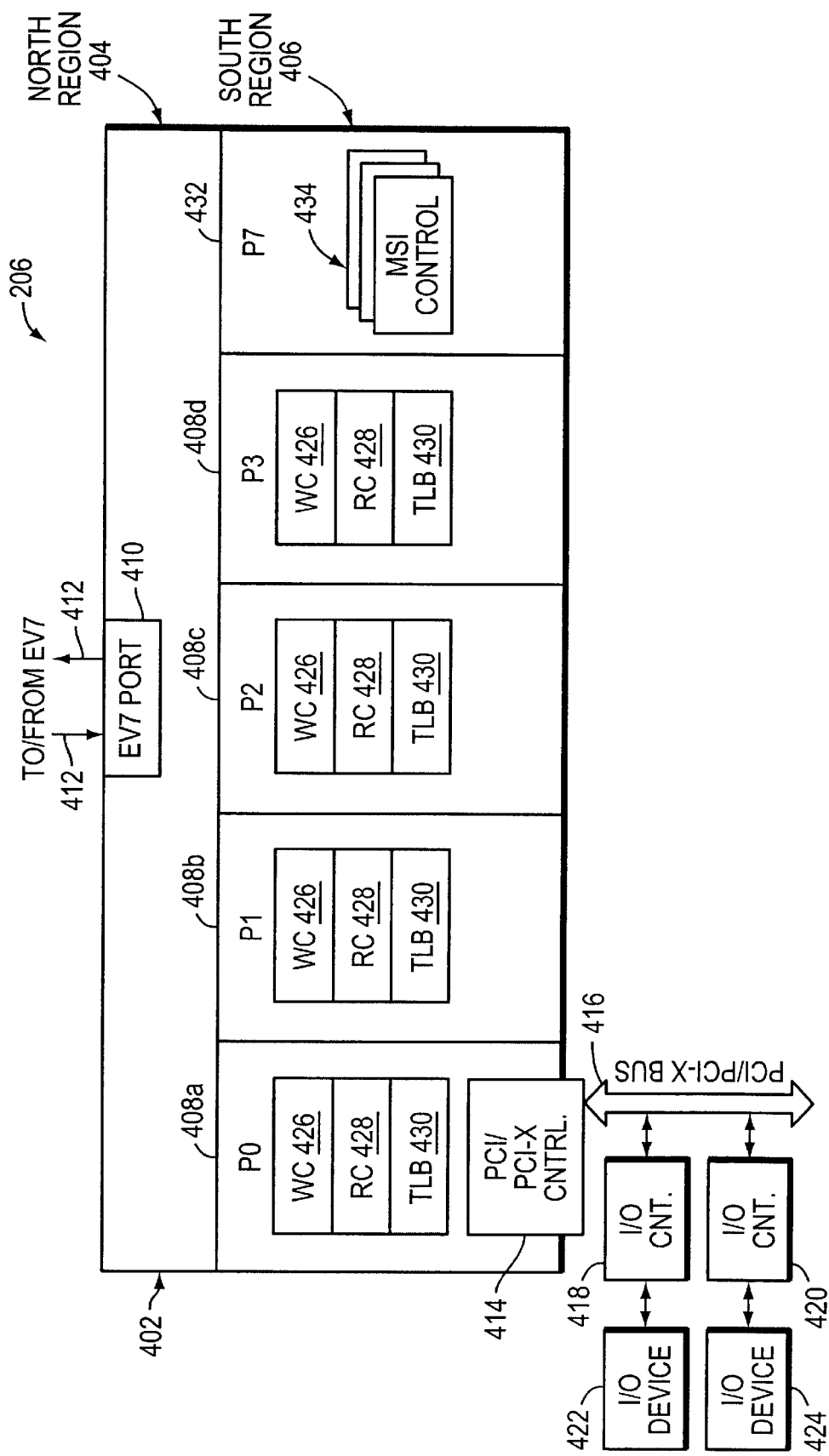
FIG. 4 is a schematic block diagram of an I/O subsystem of the computer system of FIG. 1.

FIG. 4 is a schematic block diagram of an I/O subsystem 206. The subsystem 206 includes an I/O bridge 402, which may be referred to as an "IO7", that constitutes a fundamental building block of the I/O subsystem 206. The IO7 402 is preferably implemented as an application specific integrated circuit (ASIC).

The IO7 402 comprises a North circuit region 404 that interfaces to the EV7 processor 204 to which the IO7 402 is directly coupled and a South circuit region 406 that includes a plurality of I/O data ports 408a–d (P0–P3) that preferably interface to standard I/O buses. An EV7 port 410 of the North region 404 couples to the EV7 processor 204 via two unidirectional, clock forwarded links 412. In the illustrative embodiment, three of the four I/O data ports 408a–c interface to the well-known Peripheral Component Interface (PCI) and/or PCI-Extended (PCI-X) bus standards, while the fourth data port 404d interfaces to an Accelerated Graphics Port (AGP) bus standard. More specifically, ports P0–P2 include a PCI and/or PCI-X adapter or controller card, such as controller 414 at port P0, which is coupled to and controls a respective PCI and/or PCI-X bus, such as bus 416. Attached to bus 416 may be one or more I/O controller cards, such as controllers 418, 420. Each I/O controller 418, 420, in turn, interfaces to and is responsible for one or more I/O devices, such as I/O devices 422 and 424. Port P3 may include an AGP adapter or controller card (not shown) rather than a PCI or PCI-X controller for controlling an AGP bus.

Each data port 408a–d includes a write cache (WC) 426 and a read cache (RC) 428 for buffering information being exchanged between the I/O devices and the EV7 mesh. Each data port 408a–d also includes a translation look-aside buffer (TLB) 430 for translating memory addresses from I/O space to system space.

The South region 406 further includes an interrupt port 432 (P7). The interrupt port P7 collects PCI and/or AGP level sensitive interrupts (LSIs) and message signaled interrupts (MSIs) generated by I/O devices coupled to the other south ports P0–P3, and sends these interrupts to North region 406 for transmission to and servicing by the processors 204 of the EV7 mesh. Disposed within the interrupt port P7 are a plurality of MSI control registers 434 for specifying an interrupt servicing processor to service MSIs and for keeping track of pending MSIs.

Virtual Channels

The SMP system 200 (FIG. 2) also has a plurality of virtual channels including a Request channel, a Response channel, an IO channel, a Forward channel and a Special channel. Each channel may be associated with its own buffer (not shown) on the EV7 processors 204. Ordering within a CPU 202 with respect to memory references is achieved through the use of memory barrier (MB) instructions, whereas ordering in the subsystems 206 is done both implicitly and explicitly. In the case of memory, references are ordered at the directories 312 associated with the home memories of the respective memory blocks.

Within the IO channel, write operations are maintained in order relative to write operations and read operations are maintained in order relative to read operations. Moreover, write operations are allowed to pass read operations and write acknowledgements are used to confirm that their corresponding write operations have reached a point of coherency in the system.

Cache Coherency in the EV7 Domain

As indicated above, a directory-based cache coherency policy is preferably utilized in the SMP system 200. As mentioned above, each memory block or "cache line" is associated with a directory 312 (FIG. 3) that contains information about the current state of the cache line, as well as an indication of those system agents or entities holding copies of the cache line. The EV7 204 allocates storage for directory information by using bits in the memory storage. The cache states supported by the directory 312 include: invalid; exclusive-clean (processor has exclusive ownership of the data, and the value of the data is the same as in memory); dirty (processor has exclusive ownership of the data, and the value at the processor may be different than the value in memory); and shared (processor has a read-only copy of the data, and the value of the data is the same as in memory).

If an EV7 processor 204 on a 2P module 202 requests a cache line that is resident on the other processor 204 or on the processor of another 2P module 202, the EV7 processor 204 on the latter module supplies the cache line from its memory subsystem 310 and updates the coherency state of that line within the directory 312. More specifically, in order to load data into its cache, an EV7 204 may issue a read_request (ReadReq), a read_modify_request (ReadModReq) or a read_shared_request (ReadSharedReq) message, among others, on the Request channel to the directory 312 identifying the requested data (e.g., the cache line). The directory 312 typically returns a block_exclusive_count (BlkExclusiveCnt) or a block_shared (BlkShared) message on the Response channel (assuming access to the data is permitted). If the requested data is exclusively owned by another processor 204, the directory 312 will issue a read_forward (ReadForward), a read_shared_forward (ReadSharedForward) or a read_modify_forward (ReadModForward) message on the Forward channel to that processor 204. The processor 204 may acknowledge that it has invalidated its copy of the data with a Victim or VictimClean message on the Response channel.

Cache Coherency in the I/O Domain

In the preferred embodiment, cache coherency is also extended into the I/O domain. To implement I/O cache coherency, among other reasons, the IO7 s 402 are required to obtain "exclusive" ownership of all data that they obtain from the processors 204 or the memory subsystems 310, even if the IO7 402 is only going to read the data. That is, the IO7 s 402 are not permitted to obtain copies of data and hold that data in a "shared" state, as the EV7 processors 204 are permitted to do. In addition, upon receiving a ReadForward or a ReadModForward message on the Forward channel specifying data "exclusively" owned by an IO7 402, the IO7 402 immediately releases that data. More specifically, the IO7 402 invalidates its copy of the data and, depending on whether or not the data was modified by the I/O domain, sends either a VictimClean or a Victim message to the directory 312 indicating that it has released and invalidated the data. If the data had not been modified, the VictimClean message is sent. If the data was modified, i.e., "dirtied", then the dirty data is returned to the home node with the Victim message.

To improve the operating efficiency of the SMP system 200 which requires the IO7 s 402 to obtain exclusive ownership over all requested data, even if the requested data is only going to be read and not modified, a special command, referred to as a Fetch_Request (FetchReq), is specifically defined for use by the IO7 s on the Request channel. In response to a FetchReq specifying the address of a requested cache line, the home directory for the specified cache line supplies the IO7 402 with a "snapshot" copy of the data as of the time of the FetchReq, but does not record the IO7 402 as an owner of the cache line. The IO7 s 402 are specifically configured to issue FetchReq commands only when the data is to be delivered to a consumer immediately, such as in response to a DMA read or in response to a request from a data mover, as described herein. In the preferred embodiment, the IO7 s are also configured to issue FetchReq commands only after they are sure that the data to be obtained is valid, e.g., after any updates to the data have been completed.

I/O Space Translation to System Space

The IO7 s 402 provide the I/O devices, such as devices 422 and 424, with a "window" into system memory 310. The I/O devices may then use this window to access data (e.g., for purposes of read or write transactions) in memory 310. A preferred address translation logic circuit for use with the present invention is disclosed in commonly owned, co-pending U.S. patent application Ser. No. 09/652,985, filed Aug. 31, 2000 for a Coherent Translation Look-Aside Buffer, which is hereby incorporated by reference in its entirety.

Partitions

The SMP 200 (FIG. 2) is preferably organized or divided into a plurality of partitions, such as partitions 210a–d. Each partition 210c includes one or more processors 204 and their associated memory subsystems 210 and I/O subsystems 206. Additionally, a separate operating system (OS) or a separate instance of the same operating system runs on each partition 210a–d. Partitions having varying degrees of isolation, survivability and sharing can preferably be established. For example, with a hardpartition, there is no communication between the individual partitions 210a–d. That is, the inter-processor port connections 302 that cross a partition boundary are physically or logically disabled. In this type of partition, a processor, memory or I/O failure in a first partition does not affect a second partition, which continues to operate. Each partition can be individually reset and booted via separate consoles.

Another type of partition is a semi-hard partition. With a semi-hard partition, limited communication across partition boundaries, i.e., between different partitions, is permitted. Specifically, the memory subsystems 310 of one or more partitions, e.g., partition 210a, are configured with a local memory portion and global shared memory portion 314. Local memory is only "visible" to agents of the respective partition, e.g., partition 210a, while global shared memory 314 is visible to the other partitions, e.g., partitions 210b–d. Only traffic directed to a shared global memory 314 is permitted to cross partition boundaries. Traffic directed to local memory is specifically disallowed. Failures in any partition can corrupt the global shared memory 314 within that partition, thereby possibly causing failures or other errors in the other partitions.

In a soft partition, all communication is permitted to cross partition boundaries.

A suitable mechanism for dividing the SMP system 200 into a plurality of partitions is described in commonly owned, co-pending U.S. patent application Ser. No. 09/652,458, filed Aug. 31, 2000 for Partition Configuration Via Separate Microprocessors, which is hereby incorporated by reference in its entirety.

In the illustrative embodiment, the CBOX 316 and RBOX 318 logic circuits associated with each EV7 processor 204 cooperate to provide partition boundary logic that can be programmed to implement a desired partition type, such as hard partitions, semi-hard partitions and soft partitions. More specifically, the CBOX 316 and RBOX 318 logic circuits include registers that are used by the EV7 processors to perform destination checking of memory reference transactions, e.g., reads or writes, that are to be sent from the EV7 processor as well as source checking of memory reference transactions received by the EV7. In accordance with the present invention, in order to divide the SMP system 200 into a plurality of semi-hard partitions, these registers are programmed by a system administrator such that (1) an EV7 processor located in a first partition is blocked from issuing any memory reference transactions that target an address whose home directory is located in a second partition, and (2) memory reference transactions originating from an EV7 processor located in a first partition are not executed by the EV7 processors located in any other partition.

Data Mover

Figure 5:
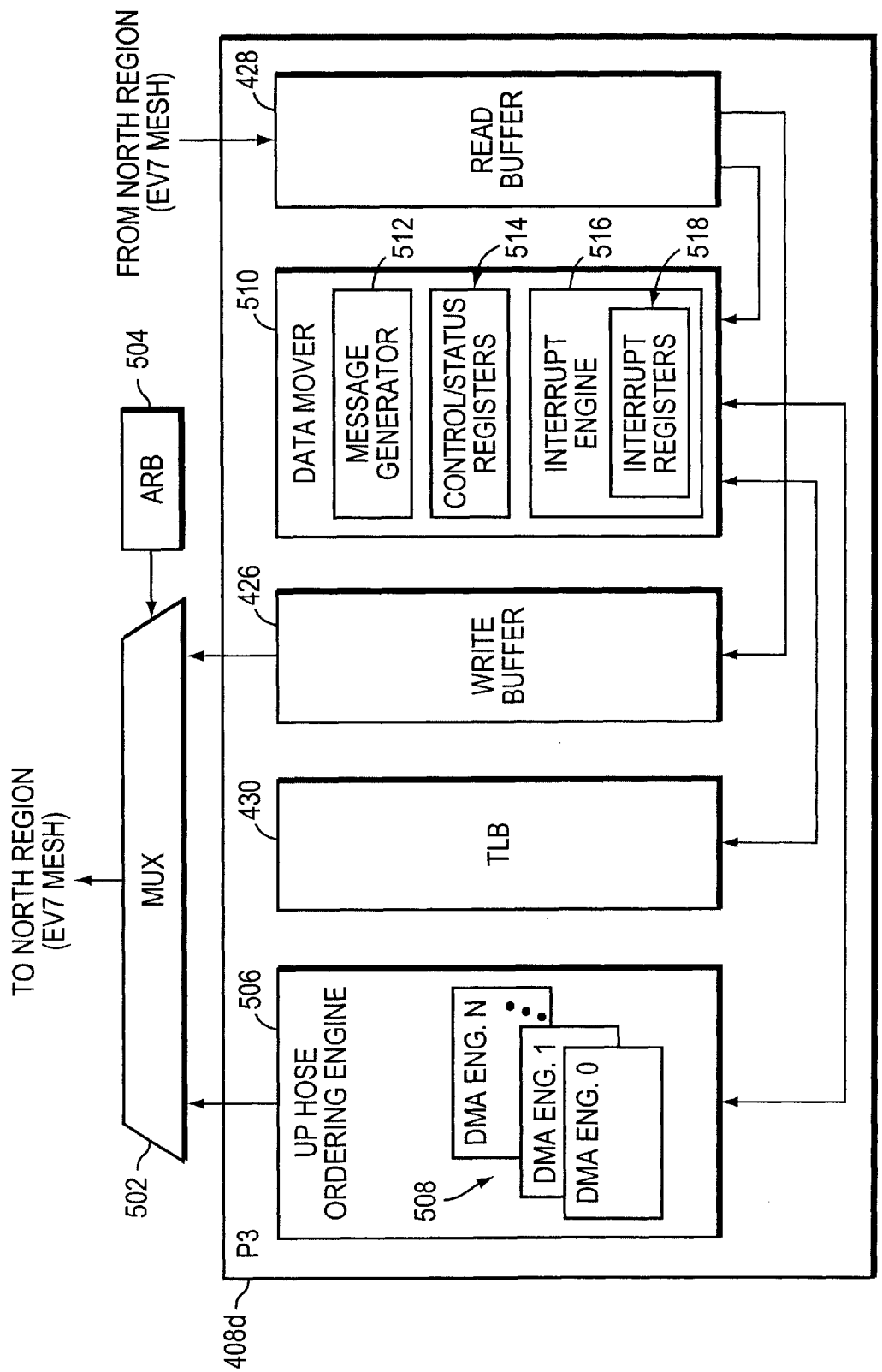
FIG. 5 is a partial, schematic block diagram of a port of an I/O bridge of the I/O subsystem of FIG. 4.

FIG. 5 is a schematic block diagram of a data port, e.g., port P3 408d, the AGP port, of an IO7 402 in greater detail. As indicated above, port P3 includes a write cache or buffer (WC) 426, a read cache or buffer (RC) 428 and a translation look-aside buffer (TLB) 430. Information received from the North region 404 of port P3 is buffered at the read cache (RC) 428 which is configured to have a plurality of entries. Information that is to be sent to the North region 404 is buffered at the WC 426. Port P3 as well as ports P0–P2 and P7 are coupled to the North region 404 through a multiplexer (MUX) 506, which provides a single output to North region 404. Messages generated within any of the south ports P0–P3 and P7 are received by and processed by the MUX 502 before transmission to North region 404 and the EV7 mesh. The MUX 506 may include an up hose arbitration (arb) logic circuit 504 for selecting among the messages received from the south ports P0–P3 and P7 for North region 404.

Port P3 further includes an up hose ordering engine 506 coupled to the MUX 502. The up hose ordering engine 506 has a plurality of, e.g., twelve, direct memory access (DMA) engines 508 that are configured to hold state for DMA read and write transactions initiated by the port. The DMA engines 508 hold the memory addresses of pending DMA transactions in both IO space format, e.g., in PCI, PCI-X and/or AGP format, as well as in system space format. The up hose ordering engine 506 also implements one or more ordering rules to insure data is updated with sequential consistency. As mentioned above, the TLB 430 converts memory addresses from IO space to system space, and contains window registers so that I/O devices can view system memory space.

Port P3 may also includes a down hose ordering engine (not shown) that is operatively coupled to the RC 428 for maintaining an index of the information buffered in the RC 428, including whether that information corresponds to ordered or unordered transactions.

In accordance with the present invention, port P3 of the IO7 402 includes a data mover 510. The data mover 510 has a message generator 512 that is configured to issue messages, such as DMA read or write transactions. Data mover 510 further includes or has access to one or more control/status registers (CSRs) 514. As explained herein, the CSRs 514 are loaded with information used to move information from one partition to another. Data mover 510 also has an interrupt engine 516 which may include its own interrupt registers 518. The interrupt engine 516 is preferably configured to generate Message Signaled Interrupts (MSI) as defined in Version 2.2 of the PCI specification standard, which is hereby incorporated by reference in its entirety. The data mover 510 is operatively coupled to the WC 426, the RC 428, the TLB 430 and the up hose ordering engine 506.

It should be understood that the data mover 510 of the present invention may be disposed at other South ports besides port P3. In a preferred embodiment, a data mover 510 is provided at each data port P0–P3, and each such data mover 510 may be individually enabled or disabled. Furthermore, although the data mover 510 is preferably provided at a South port to which no I/O devices are coupled, it may nonetheless be enabled on a South port having one or more I/O devices. Preferably, the I/O devices remain in a quiescent state while the data mover is operating.

Figure 6A:
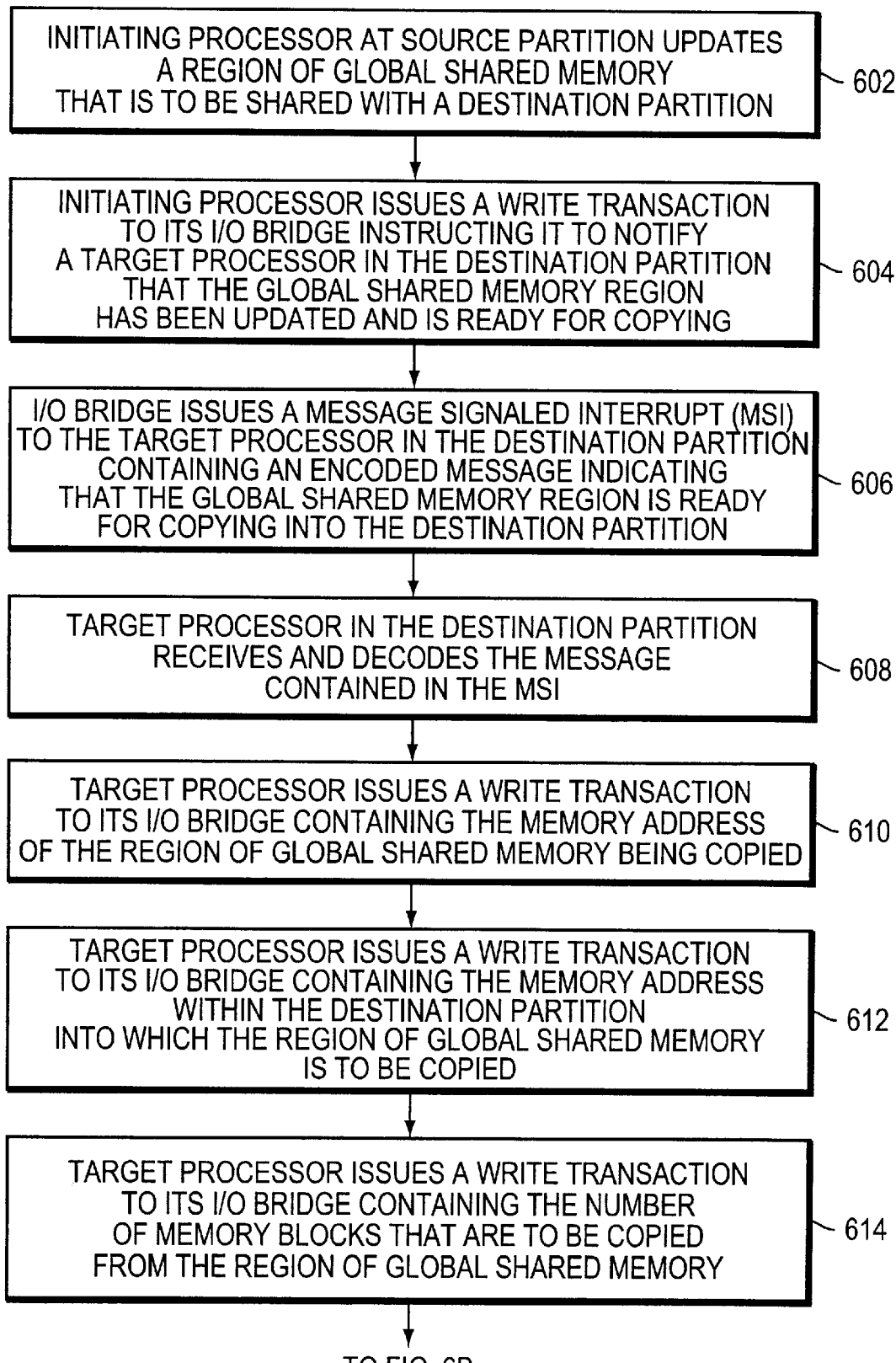
FIGS. 6A–C is a flow diagram of a method of the present invention.
Figure 6B:
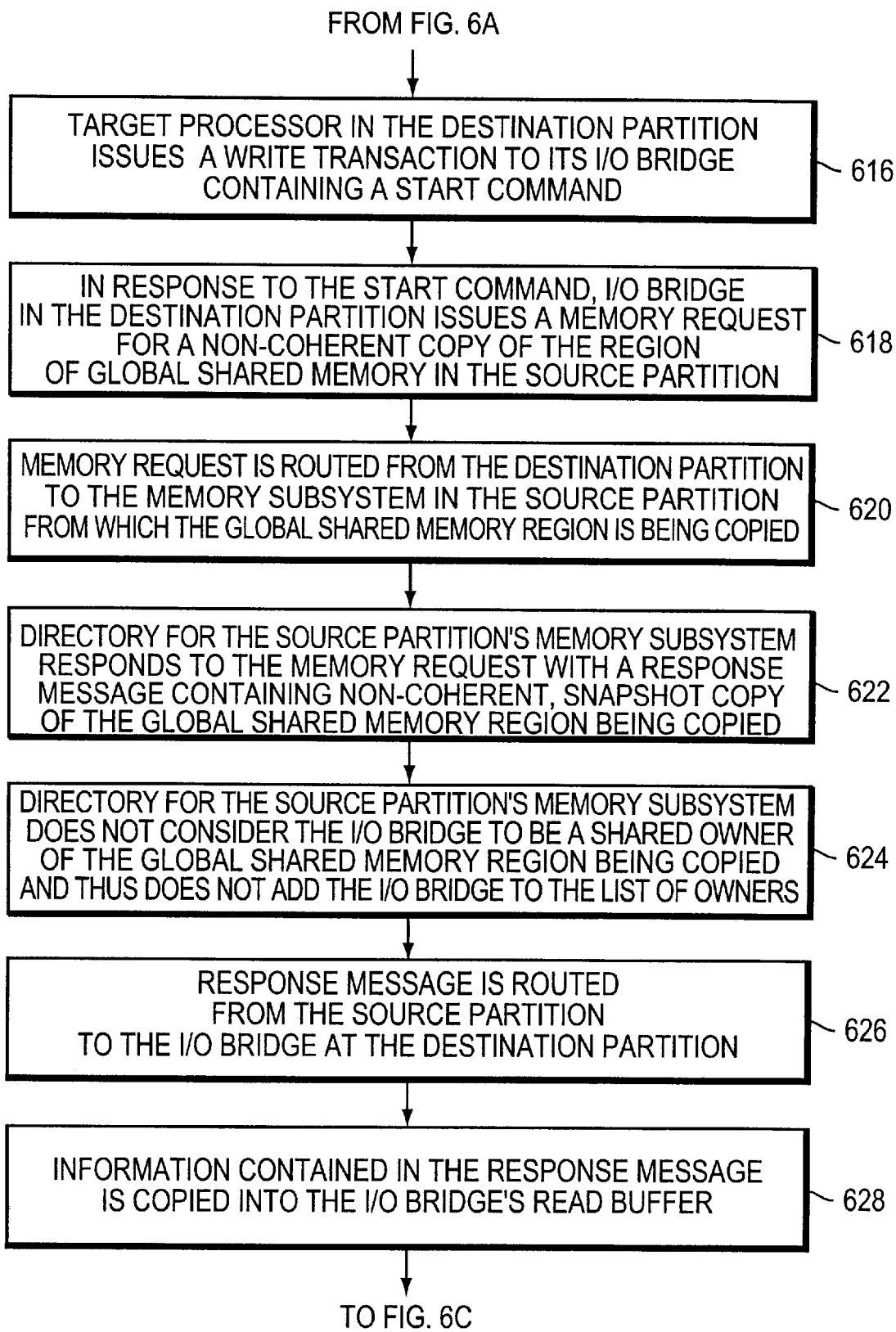
Figure 6C:
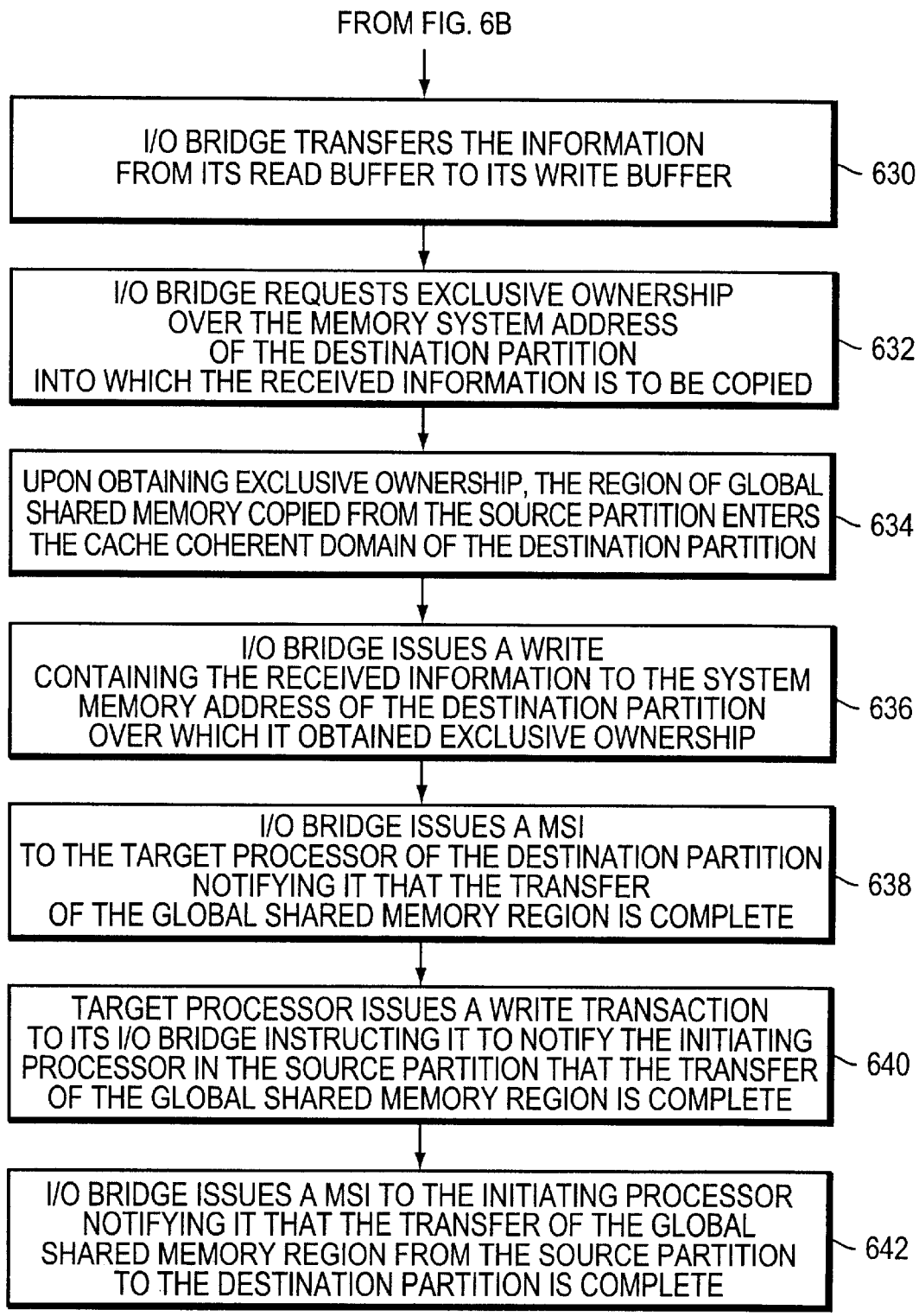

FIGS. 6A–C are a flow diagram of a preferred method of moving information across partition boundaries. Suppose, for example, that CPU 01 in partition 210a (FIG. 2) has an update that it wants to make to a region of global shared memory 314 in partition 210a, which may be referred to as the source partition. In addition, suppose that CPU 01 is aware that CPU 07 in partition 210b, which may be referred to as the destination partition, is interested in information at the region of global shared memory 314 to be updated. CPU 01, which may be referred to as the initiating processor, first updates the respective region of global shared memory 314, as indicated at block 602. CPU 01 then issues a write transaction, such as a write_input_output (WrIO) message, to the IO7 402 that is directly coupled to CPU 01 (i.e., to the IO7 402 that is connected to CPU 01 via I/O port 304), instructing the IO7 402 to inform CPU 07, which may be referred to as the target processor, that the region of global shared memory 314 has been updated and is ready for copying, as indicated by block 604. The WrIO may target a pre-defined CSR 514 (FIG. 5) at the data mover 510 in the IO7 402 directly coupled to CPU 01. It may also include the address of the target processor, CPU 07, and the message to be sent. The message may be or may include an operation code (opcode) that is associated with a particular action, e.g., fetch memory block(s) from previously defined region of global shared memory of source partition 210a.

The IO7 402 in the source partition 210a preferably responds by causing its interrupt engine 516 to generate a Message Signaled Interrupt (MSI), as indicated at block 606. The interrupt engine 516 selects an address for the MSI such that the MSI will be mapped to a particular MSI control register 434 at interrupt port 432. The interrupt engine 516 also encodes or loads the message received from the initiating processor, CPU 01, into the message data field of the MSI. The interrupt engine 516 passes the MSI to the interrupt port, P7, of the South region 406. By virtue of the address selected by the interrupt engine 516, the MSI maps to a MSI control register 434 whose interrupt servicing processor is CPU 07. Interrupt port 432 generates a write_internal_processor_register (WrIPR) message that is addressed to a register of CPU 07 and that includes the message specified by the initiating process CPU 01. Interrupt port 432 then passes the WrIPR into North region 404 and into the EV7 mesh of the source partition 210a. The WrIPR is routed through the SMP computer system 200 from the source partition 210a to the destination partition 210b. The WrIPR is received at the target processor, CPU 07, which decodes the message contained therein (i.e., maps the opcode to its associated action), as indicated at block 608. The target processor thus learns that a region of global shared memory within source partition 210a has been updated and is ready for copying.

Setup Phase

In response, the target processor, CPU 07, configures the data mover 410 disposed at the IO7 402 that is directly coupled to the target processor to perform the transfer of information from the source partition 210a to the destination partition 210d. Specifically, the target processor, CPU 07, issues a WrIO to the IO7 402 to which the target processor is directly coupled. This WrIO contains the source memory address, preferably in I/O space format, of the region of global shared memory 314 that has been updated and is ready for copying, as indicated at block 610. This WrIO may target a predetermined CSR 514 of the data mover 510, such as a "source address" register. The target processor, CPU 07, may know or learn of the memory address for the region of global shared memory 314 through any number of ways. For example, global shared memory 314 may always start at the same physical address within each partition 210a–d. Alternatively, during initialization of the SMP computer system 200, system management facilities may use a backdoor mechanism to inform partition 210b of the address of the global shared memory 314 at partition 210a. The global shared memory 314 could also be in a virtual address space specified by a scatter-gather map also located in partition 210a. During initialization, partition 210b could be provided with the memory address of the scatter-gather map at partition 210a. Target processor CPU 07 could then use the present method first to retrieve the scatter-gather map so that it may derive the memory address of the region of global shared memory 314 to be copied.

Target processor, CPU 07, also issues a WrIO to its IO7 402 notifying the IO7 402 of an address within the destination partition 210b into which the region of global shared memory 314 is to be copied, as indicated at block 612. Target processor, CPU 07, may also issues a WrIO to its IO7 402 specifying the number of memory blocks, e.g., cache lines, that are to be copied from the region of shared global memory 314 at the source partition 210a, as indicated at block 614. The WrIOs of blocks 612 and 614 may be directed to other CSRs 514 at the data mover 510, such as a "destination address" register and a "transfer size" register. At this point, the configuration or setup of the data mover 510 is complete.

Data Transfer Phase

To start the data transfer process, the target processor, CPU 07 issues a WrIO to its IO7 402 containing a start command, as indicated at block 616 (FIG. 6B). The WrIO may set a start bit of a CSR 514 at the data mover 510. In response to the start command, the data mover 510 in the destination partition 210b utilizes its message generator 512 to issue a memory reference request for a non-coherent copy of the specified region of global shared memory 314 in the source partition 210a, as indicated at block 618. In particular, the data mover 510 first accesses the TLB 430 in order to translate the memory address of the region of global shared memory 314, as specified by the target processor, from IO space to system space. In the preferred embodiment, the memory reference request is preferably a Fetch_Request (FetchReq), which is defined within the SMP system 200 as an IO channel, non-coherent DMA read message. The FetchReq includes the starting memory address and the number of memory blocks that are being read from the global shared memory 314. The FetchReq is placed in the up hose ordering engine 506, and a DMA engine 508 is assigned to process it. The FetchReq is passed up to the North region 404 of the IO7 402 and enters the EV7 mesh of the destination partition 210b. The SMP system 200 routes the FetchReq from the destination partition 210b to the source partition 210a, as indicated at block 620.

As explained above, in a semi-hard partitioned system, destination and source checking of memory read and write requests blocks the EV7 processors 204 located in a first partition from accessing data in a second partition. However, because the FetchReq is from an IO7 402 as opposed to an EV7 processor, and it is requesting a non-coherent copy of data, it is explicitly allowed to cross semi-hard partition boundaries. In other words, the CBOX and RBOX settings do not block such requests.

Accordingly, the FetchReq is received at the directory 312 associated with the home memory subsystem 210 of the region of global shared memory 314 being copied. In response to the FetchReq, the directory 312 issues a memory response transaction or message that contains a non-coherent copy of the specified region of global shared memory 314, as indicated at block 622. In the preferred embodiment, the memory response transaction is a Block_Invalid (BlkInval), which is defined within the SMP system 200 as a Response channel message that carries, despite its name, a valid, but non-coherent copy of data. The non-coherent copy of data that is attached to the BlkInval issued by directory 312 basically constitutes a snapshot copy of the specified region of global shared memory as of the time the FetchReq is received at the directory 312. Furthermore, because the IO7 402 in the destination partition 210b issued a FetchReq, as opposed to a Read_Request (ReadReq), for the region of global shared memory 314, the directory 312 does not consider the IO7 402 within the destination partition 210c to be getting a shared, coherent copy of the data. Accordingly, the directory 312 does not add the IO7 402 to its list of entities or agents having a shared, coherent copy of the data, as indicated at block 624.

As indicated above, the SMP system 200 is configured to check messages crossing partition boundaries during the request phase. Such checking does not, however, take place during the response phase. Accordingly, the BlkInval, which includes a copy of the region of global shared memory 314, is routed by the SMP system 200 from the source partition 210a to the destination partition 210b, as indicated at block 626. The BlkInval message is delivered to the IO7 402 that issued the FetchReq. The BlkInval message is passed down from the North region 404 to port P3 of the South region 406. Port P3 buffers the received information in its RC 428, as indicated at block 628. The data mover 510 is notified that the region of global shared memory 314 that it requested has been received. The data mover 510 then transfers that information over to the WC 426 in preparation for writing the information into the memory subsystem 210 of the destination partition 210b, as indicated at block 630 (FIG. 6C).

The data mover 510 next accesses the destination memory address to which the received region of global shared memory 314 is to be written. As described above, this memory address was previously specified by the target processor, CPU 07, in I/O space format and stored at a CSR 514. The data mover 510 utilizes the TLB 430 to translate the memory address from I/O space to system space. The data mover 510 then issues a request for exclusive ownership over this memory address, as indicated at block 632. In particular, the message generator 512 of the data mover 510 preferably issues a read_modify_request (ReadModReq), which is defined within the SMP system 200 as a Request channel message seeking exclusive ownership over the specified memory address. The ReadModReq is routed within the destination partition 210b to the directory 312 associated with the home memory subsystem 310 for the specified destination memory address.

The directory 312 preferably responds to the IO7 402 with a block_exclusive_count (BlkExclusiveCnt), which is defined within the SMP system 200 as a Response channel message. The BlkExclusiveCnt includes a count that corresponds to the number of entities having a shared copy of the data corresponding to the specified memory address, as determined by the directory 312. If the count is zero, no agents have a shared copy of the data. If the count is non-zero, the directory 312 sends probes to each agent having a shared copy of the data instructing them to invalidate their shared copy. Upon invalidating their shared copy, each agent sends an Invalid_Acknowledgement (InvalAck) to both the directory 312 and to the IO7 402. The IO7 402 decrements the specified count upon receipt of each InvalAck. When the count reaches zero, the IO7 402 "knows" that the directory 312 now considers the IO7 402 to be the exclusive owner of the respective memory block(s). At this point, the region of global shared memory 314 copied from the source partition 210a is part of the cache coherent domain of the destination partition 210b, as indicated at block 634.

The data mover 510 next directs its message generator 512 to issue a write transaction writing the received region of global shared memory 314 into the home memory subsystem 310 within the destination partition 210b, i.e., to the destination address specified by the target processor, CPU 07, as indicated at block 636. In the preferred embodiment, the message generator 512 issues a Victim message, which is defined in the SMP system 200 as a Response channel message containing data that has been modified by the sending agent. Attached to the Victim message is the region of global shared memory 314 received from the source partition 210a. The Victim message is received at the directory 312 associated with the home memory subsystem 310 for the specified destination memory address. The directory 312 writes the data into the home memory subsystem 310 and updates its records to reflect that the home memory subsystem 310 now has the most up-to-date copy of the memory block(s).

The data mover 510 preferably notifies the target processor, CPU 07, that the region of global shared memory 314 has been successfully copied from the source partition 210a and entered into the cache coherent domain of the destination partition 210b, as indicated at block 638. This is preferably accomplished through a MSI generated by the interrupt engine 516 and carrying an appropriate opcode in its message data field. In response, the target processor, CPU 07, may issue a WrIO to the data mover 510 instructing it to notify the initiating processor, CPU 01, in the source partition 210a that the transfer has been successfully completed, as indicated at block 640. The WrIO may be a write to a CSR 514 and may include an encoded message to be sent to CPU 01. In response, the data mover 510 directs the interrupt engine 518 to issue a MSI, which includes the encoded message specified by the target processor, CPU 07, in its message data field, as indicated at block 642. By virtue of the address selected by the interrupt engine 516 for this MSI, the MSI is mapped by the interrupt port 432 to a MSI control register 434 whose interrupt servicing processor is CPU 01. The initiating processor, CPU 01, thus learns that the transfer of the region of global shared memory 314 that it updated was successfully completed.

It should be understood that the MSI sent from the IO7 402 in the source partition 210a to the target processor in the destination partition 210d may be encoded with other actions in addition to the "fetch memory block(s) associated with this message" action described above. For example, the action may direct the target processor to fetch one or more memory blocks from the source partition that contain a list of memory addresses to be copied into the destination partition. An MSI from the IO7 402 in the destination partition 210d may also be used to notify the initiating processor of the source partition 210a that the transfer failed for some reason.

Those skilled in the art will recognize that the communication mechanism of the present invention may be used for still further purposes.

It should be understood that some or all of the CSRs 514 of the data mover 510 could be combined. For example, the source address, destination address and transfer size registers could be combined into a single CSR. The target processors, moreover, could issue a single WrIO populating this entire CSR.

It should be understood that the present invention may used with multiprocessor architectures having other types of interconnect designs beside a torus. For example, the present invention may be used with mesh interconnects, bus or switch-based interconnects, hypercube and enhanced hypercube interconnects, among others. It may also be used in cluster architectures.

By locating the data mover in the I/O bridge, i.e., the IO7 402, information is transferred from the source partition 210a to the destination partition 210c at the operating or clock speeds of the processor and memory interconnects, which is substantially faster than the clock or operating speeds utilized by the I/O busses. It should be understood, moreover, that the data mover of the present invention may be disposed in the North region 304 of the IO7 402, in different I/O bridge designs, in a processor module or node or at other locations. Furthermore, the target processor may specify the source system address from which information is to be copied and the destination system address into which that information is to be placed in system rather than I/O space.

It should also be understood that the data mover of the present invention can be utilized as an inter-partition security mechanism. As explained above, partition boundary logic is specifically configured to block memory reference operations from crossing partition boundaries. Only the data mover of the present invention is able to move data between the boundaries. Thus, access to data in a first partition by an entity in a second partition is strictly controlled.

The foregoing description has been directed to specific embodiments of the present invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. In a cache coherent, multiprocessor computer system that has been divided into a plurality of partitions including a source partition and a destination partition, a system for moving information among the partitions of the computer system, each partition having one or more interconnected processors, and memory subsystems, the memory subsystem of at least the source partition including a region of global shared memory, each partition configured to run either a separate operating system or a separate instance of an operating system, the system comprising:

a read cache located in the destination partition; and a data mover located in the destination partition, the data mover coupled to the read cache and having a message generator;

wherein the message generator is configured to issue a first memory reference transaction to a selected memory subsystem of the source partition requesting a non-coherent copy of a specified portion of the region of global shared memory, in response to the first memory reference transaction, the selected memory subsystem at the source partition is configured to issue a second memory reference transaction to the data mover, the second memory reference transaction including a non-coherent copy of the specified portion of the region of global shared memory, the read cache is configured to buffer the specified portion of the region of global shared memory received from the source partition, and the message generator is configured to issue a third memory reference transaction to a selected memory subsystem of the destination partition requesting exclusive ownership over a destination memory address for the specified portion of the region of global shared memory.

2. The system of claim 1 wherein, upon obtaining exclusive ownership over the destination memory address, the message generator is configured to issue a fourth memory reference transaction storing the specified portion of the region of global shared memory at the destination memory address.

3. The system of claim 1 further comprising one or more control/status registers (CSRs) located in the destination partition, the one or more CSRs configured to be accessible by the data mover and to receive a source memory address for the specified portion of the region of global shared memory located in the source partition, and the destination memory address in the destination partition.

4. In a cache coherent, multiprocessor computer system that has been divided into a plurality of partitions including a source partition and a destination partition, a system for moving information among the partitions of the computer system, each partition having one or more interconnected processors, and memory subsystems, the memory subsystem of at least the source partition including a region of global shared memory, the system comprising:

a read cache located in the destination partition;

a data mover located in the destination partition, the data mover coupled to the read cache and having a message generator; and one or more control/status registers (CSRs) located in the destination partition, the one or more CSRs configured to be accessible by the data mover and to receive a source memory address for the specified portion of the region of global shared memory located in the source partition, and the destination memory address in the destination partition, wherein the message generator is configured to issue a first memory reference transaction to a selected memory subsystem of the source partition requesting a non-coherent copy of a specified portion of the region of global shared memory, in response to the first memory reference transaction, the selected memory subsystem at the source partition is configured to issue a second memory reference transaction to the data mover, the second memory reference transaction including a non-coherent copy of the specified portion of the region of global shared memory, the read cache is configured to buffer the specified portion of the region of global shared memory received from the source partition, the message generator is configured to issue a third memory reference transaction to a selected memory subsystem of the destination partition requesting exclusive ownership over a destination memory address for the specified portion of the region of global shared memory, and the memory subsystems of the computer system are organized into memory blocks, and the one or more CSRs are further configured to receive a number of memory blocks to be transferred from the source partition into the destination partition.

5. The system of claim 1 wherein the destination partition includes an input/output (I/O) bridge, and the read cache and the data mover are disposed in the I/O bridge.

6. The system of claim 4 wherein the I/O bridge includes a North circuit region that is directly coupled to a processor, and a South circuit region that is in communicating relationship with the North circuit region and has a plurality of data ports, and the read cache and the data mover are disposed at one of the data ports of the South circuit region.

7. The system of claim 6 wherein the given I/O bridge is implemented as an application specific integrated circuit (ASIC).

8. The system of claim 1 wherein the data mover further includes an interrupt engine configured to issue an interrupt to a target processor located in the destination processor upon obtaining exclusive ownership over the destination memory address.

9. The system of claim 8 wherein the interrupt is a Message Signaled Interrupt as defined in the Peripheral Component Interconnect (PCI) specification standard.

10. In a cache coherent, multiprocessor computer system that has been divided into a plurality of partitions including a source partition and a destination partition, a system for moving information among the partitions of the computer system, each partition having one or more interconnected processors, and memory subsystems, the memory subsystem of at least the source partition including a region of global shared memory, the system comprising:

a read cache located in the destination partition; and a data mover located in the destination partition, the data mover coupled to the read cache and having a message generator;

wherein the message generator is configured to issue a first memory reference transaction to a selected memory subsystem of the source partition requesting a non-coherent copy of a specified portion of the region of global shared memory, in response to the first memory reference transaction, the selected memory subsystem at the source partition is configured to issue a second memory reference transaction to the data mover, the second memory reference transaction including a non-coherent copy of the specified portion of the region of global shared memory, the read cache is configured to buffer the specified portion of the region of global shared memory received from the source partition, the message generator is configured to issue a third memory reference transaction to a selected memory subsystem of the destination partition requesting exclusive ownership over a destination memory address for the specified portion of the region of global shared memory, the data mover further includes an interrupt engine configured to issue an interrupt to a target processor located in the destination processor upon obtaining exclusive ownership over the destination memory address, the interrupt is a Message Signaled Interrupt as defined in the Peripheral Component Interconnect (PCI) specification standard, the destination partition includes an input/output (I/O) bridge, the read cache and the data mover, including the message generator and the interrupt engine, are disposed in the I/O bridge, and the I/O bridge is implemented as an application specific integrated circuit (ASIC).

11. In a cache coherent, multiprocessor computer system that has been divided into a plurality of partitions including a source partition and a destination partition, a system for moving information among the partitions of the computer system, each partition having one or more interconnected processors, and memory subsystems, the memory subsystem of at least the source partition including a region of global shared memory, the system comprising:

a read cache located in the destination partition; and a data mover located in the destination partition, the data mover coupled to the read cache and having a message generator;

wherein the message generator is configured to issue a first memory reference transaction to a selected memory subsystem of the source partition requesting a non-coherent copy of a specified portion of the region of global shared memory, in response to the first memory reference transaction, the selected memory subsystem at the source partition is configured to issue a second memory reference transaction to the data mover, the second memory reference transaction including a non-coherent copy of the specified portion of the region of global shared memory, the read cache is configured to buffer the specified portion of the region of global shared memory received from the source partition, the message generator is configured to issue a third memory reference transaction to a selected memory subsystem of the destination partition requesting exclusive ownership over a destination memory address for the specified portion of the region of global shared memory, the memory subsystems define a plurality of memory blocks each having a home subsystem, and the multiprocessor computer system includes partition boundary logic that is configured to:

block a processor located in a first partition from issuing a memory reference targeting a memory block whose home subsystem is located in a second partition; and refuse execution of a memory reference received by a processor located in the first partition from a processor located in the second partition.

12. In a cache coherent, multiprocessor computer system that has been divided into a plurality of partitions including a source partition and a destination partition, and each partition has one or more interconnected processors, and memory subsystems, and the memory subsystem of at least the source partition includes a region of global shared memory, each partition configured to run either a separate operating system or a separate instance of an operating system, a method for moving information among the partitions of the computer system, the method comprising the steps of:

providing a read cache located in the destination partition;

providing a data mover located in the destination partition, the data mover coupled to the read cache and having a message generator;

issuing a first memory reference transaction from the data mover to a selected memory subsystem of the source partition requesting a non-coherent copy of a specified portion of the region of global shared memory;

in response to the first memory reference transaction, issuing a second memory reference transaction from the selected memory subsystem at the source partition to the data mover in the destination partition, the second memory reference transaction including a non-coherent copy of the specified portion of the region of global shared memory;

buffering the specified portion of the region of global shared memory received from the source partition at the read cache; and issuing a third memory reference transaction from the data mover to a selected memory subsystem of the destination partition requesting exclusive ownership over a destination memory address for the specified portion of the region of global shared memory.

13. The method of claim 12 further comprising the steps of:

updating, within the source partition, the specified portion of the region of global shared memory; and notifying a target processor located in the destination partition that the specified portion of the region of global shared memory at the source partition has been updated.

14. In a cache coherent, multiprocessor computer system that has been divided into a plurality of partitions including a source partition and a destination partition, and each partition has one or more interconnected processors, and memory subsystems, and the memory subsystem of at least the source partition includes a region of global shared memory, a method for moving information among the partitions of the computer system, the method comprising the steps of:

providing a read cache located in the destination partition;

providing a data mover located in the destination partition, the data mover coupled to the read cache and having a message generator;

issuing a first memory reference transaction from the data mover to a selected memory subsystem of the source partition requesting a non-coherent copy of a specified portion of the region of global shared memory;

in response to the first memory reference transaction, issuing a second memory reference transaction from the selected memory subsystem at the source partition to the data mover in the destination partition, the second memory reference transaction including a non-coherent copy of the specified portion of the region of global shared memory, buffering the specified portion of the region of global shared memory received from the source partition at the read cache;

issuing a third memory reference transaction from the data mover to a selected memory subsystem of the destination partition requesting exclusive ownership over a destination memory address for the specified portion of the region of global shared memory, updating, within the source partition, the specified portion of the region of global shared memory; and notifying a target processor located in the destination partition that the specified portion of the region of global shared memory at the source partition has been updated, wherein each partition of the computer system includes an input/output (I/O) bridge and the steps of notifying the target processor comprises the steps of:

issuing a write transaction to a given I/O bridge in the source partition, the write transaction including a notification message;

in response to the write transaction, issuing an interrupt from the given I/O bridge in the source partition to the target processor in the destination partition, the interrupt including the notification message; and receiving the interrupt including the notification message at the target processor.

15. The method of claim 14 wherein the steps of updating the specified portion of the region of global shared memory, and of issuing the write transaction that includes the notification message to the given I/O bridge in the source partition are performed by an initiating processor located in the source partition.

16. The method of claim 14 wherein the interrupt issued to the target processor is a Message Signaled Interrupt as defined in the Peripheral Component Interconnect (PCI) specification standard.

17. The method of claim 13 further comprising the step of issuing one or more write transactions from the target processor to the data mover, the one or more write transactions specifying a source memory address for the specified portion of the region of global shared memory at the source partition, and the destination memory address.

18. The method of claim 17 further comprising steps of:

issuing a write transaction from the target processor to the data mover located in the destination partition that includes a start command; and in response to the start command, performing the step of issuing the first memory reference transaction.

19. In a cache coherent, multiprocessor computer system that has been divided into a plurality of partitions including a source partition and a destination partition, and each partition has one or more interconnected processors, and memory subsystems, and the memory subsystem of at least the source partition includes a region of global shared memory, a method for moving information among the partitions of the computer system, the method comprising the steps of:

providing a read cache located in the destination partition;

providing a data mover located in the destination partition, the data mover coupled to the read cache and having a message generator;

issuing a first memory reference transaction from the data mover to a selected memory subsystem of the source partition requesting a non-coherent copy of a specified portion of the region of global shared memory;

in response to the first memory reference transaction, issuing a second memory reference transaction from the selected memory subsystem at the source partition to the data mover in the destination partition, the second memory reference transaction including a non-coherent copy of the specified portion of the region of global shared memory;

buffering the specified portion of the region of global shared memory received from the source partition at the read cachet; and issuing a third memory reference transaction from the data mover to a selected memory subsystem of the destination partition requesting exclusive ownership over a destination memory address for the specified portion of the region of global shared memory, wherein the destination partition includes an input/output (I/O) bridge, the read cache and the data mover, including the message generator, are disposed in the I/O bridge, and the I/O bridge is implemented as an application specific integrated circuit (ASIC).

* * * * *